(12) United States Patent
Heindl

(10) Patent No.: US 8,574,109 B2
(45) Date of Patent: Nov. 5, 2013

(54) DRIVE ARRANGEMENT FOR VEHICLES WITH AT LEAST TWO DRIVABLE VEHICLE AXLES

(75) Inventor: Richard Heindl, Marktoberdorf (DE)

(73) Assignee: AGCO GmbH, Marktoberdorf (DE)

( * ) Notice: Subject to any disclaimer, the term of this patent is extended or adjusted under 35 U.S.C. 154(b) by 1327 days.

(21) Appl. No.: 12/116,671

(22) Filed: May 7, 2008

(65) Prior Publication Data
US 2008/0280719 A1    Nov. 13, 2008

(30) Foreign Application Priority Data
May 9, 2007   (DE) .......................... 10 2007 021 733

(51) Int. Cl.
*F16H 47/04*   (2006.01)
(52) U.S. Cl.
USPC ............................................................ 475/74
(58) Field of Classification Search
USPC ............................................... 475/24, 74, 75
See application file for complete search history.

(56) References Cited

U.S. PATENT DOCUMENTS

| | | | |
|---|---|---|---|
| 6,604,596 B2* | 8/2003 | Bracke et al. ................. | 180/242 |
| 7,089,824 B2* | 8/2006 | Nakatani et al. ............. | 74/730.1 |
| 7,661,495 B2* | 2/2010 | Zohrer et al. ............. | 180/65.22 |
| 2002/0074177 A1 | 6/2002 | Pasquini et al. | |
| 2003/0066729 A1* | 4/2003 | Feldhaus et al. ............. | 192/48.8 |

FOREIGN PATENT DOCUMENTS

| | | |
|---|---|---|
| DE | 4209950 | 9/1993 |
| DE | 19610821 C2 | 9/1997 |
| EP | 1234706 B1 | 8/2002 |
| WO | WO 2006034520 A1 * | 4/2006 |

OTHER PUBLICATIONS

German Examination Report for German Patent Application No. 102007021733.3 dated Mar. 7, 2008.

* cited by examiner

*Primary Examiner* — Erin D Bishop

(57) ABSTRACT

The present invention relates to a drive arrangement for vehicles with at least two drivable vehicle axles (V, H). The drive arrangement is particularly suitable for utility vehicles and agricultural tractors. It has at least one first motor (11), which is propulsively connected to a first vehicle axle (H), and a second motor (12), which is propulsively connected to a second vehicle axle (V). At least one of the motors is a de-connectable motor (12), which can be disconnected from the propulsive connection to the associated vehicle axle (V). Regardless of whether the de-connectable motor (12) is propulsively connected to the associated vehicle axle (V) or is propulsively disconnected therefrom, a propulsive connection can be selectively made and broken between the first and the second vehicle axle (V, H).

19 Claims, 5 Drawing Sheets

DRIVE ARRANGEMENT FOR VEHICLES WITH AT LEAST TWO DRIVABLE VEHICLE AXLES

CROSS REFERENCE TO RELATED APPLICATION

This application is based on, and claims the benefit of priority to, German application DE 10 2007 021 733.3, filed 9 May 2007, which priority application is hereby incorporated by reference.

BACKGROUND OF THE INVENTION

1. Field of Invention

The present invention relates to a drive arrangement for vehicles with at least two drivable vehicle axles, wherein the drive arrangement comprises at least one first motor, which is propulsively connected to a first vehicle axle, and a second motor, which is propulsively connected to a second vehicle axle. The drive arrangement according to the invention is particularly suitable for utility vehicles and agricultural tractors.

2. Description of Related Art

Utility vehicles, particularly agricultural utility vehicles such as for example a farm tractor, frequently have at least two drivable vehicle axles. Also passenger cars, which are designed to travel over wet or smooth roadways and off-road, frequently have two drivable vehicle axles. In the case of such vehicles and particularly over rough terrain all vehicle axles and thus all wheels can be driven, so that—as is generally known for all-wheel drives—traction is improved as a result.

The German Patent DE 42 09 950 C2 describes a drive for twin-axled vehicles used in agriculture and/or civil engineering. The construction of such a drive 30 is illustrated in FIG. 1. In the case of this drive an internal combustion engine 1 (or a crankshaft of the internal combustion engine) is operatively coupled via a clutch 2 to the input shaft 3 of a power-branched planetary transmission 4. The planetary transmission 4 is formed by way of a planetary gear and splits the power, delivered by the input shaft 3, into a hydrostatic and into a mechanical power branch. More particularly a first output shaft 5 of the planetary transmission 4 directly drives a differential gear 6 of a rear axle H of the utility vehicle and thereby forms the mechanical power branch. A second output shaft 7 of the planetary transmission 4 drives an adjustable hydraulic pump 10 via a gear wheel stage 8, 9 and thereby forms the hydrostatic power branch. The hydraulic pump 10 in turn drives two parallel-connected, adjustable hydraulic motors 11, 12 via (not illustrated) hydraulic lines. The hydraulic motors 11, 12 comprise output shafts 13, 14 aligned with one another in each case. The output shaft 13 of the hydraulic motor 11 drives the first output shaft 5 of the planetary transmission 4 and thus the differential gear 6 of the rear axle H of the utility vehicle via a gear wheel stage 15, 16. The output shaft 14 of the hydraulic motor 12 drives the power train 17 leading to the front axle V via a gear wheel stage 18, 19. Both output shafts 13, 14 can be coupled together by means of a clutch 20.

In DE 42 09 950 C2 the hydraulic pump 10 is adjusted as a function of the power demand, which the driver sets by corresponding movement of the accelerator pedal and/or a driving speed lever. Furthermore, driving states of the vehicle, such as for example the stationary state of the vehicle, while the engine is running, reverse and forward gear can be adjusted and changed in a simple manner by regulating the hydraulic pump. The hydraulic motors 11, 12 are governed by a (not illustrated) control unit. While the vehicle is in operation the clutch 20 is usually disengaged and the (not illustrated) control unit, according to the respective operating conditions, distributes the available drive power to the hydraulic motors 11, 12 and thus to the vehicle axles H, V.

Thus, variable rotational speed and torque distribution between front axle V and rear axle H can be achieved. Such variable rotational speed and torque distribution between front axle V and rear axle H is particularly advantageous when travelling over rough terrain and with wide steering angles of the steerable vehicle axles. Particularly the rotational speed of the output shaft 14 of the hydraulic motor 12, which drives the front axle V, must be increased when rounding tight bends, since the front wheels of the vehicle cover a greater distance than the rear wheels when rounding tight bends.

Nevertheless, when travelling over rough terrain, it may occur that the driven wheels lose their capacity to transmit tractive force and spin with extremely one-sided axle load distribution and high traction power demand. If this occurs the control unit engages the clutch 20. Thus both vehicle axles H and V are temporarily driven with a constant rotational speed ratio and up to 100% of the possible transmission output torque can be transmitted via a vehicle axle H or V. Particularly torque, higher than can be made available alone by the hydraulic motor 12, can be transmitted if required via the front vehicle axle V, with engaged clutch 20. Equally torque, higher than the sum of the mechanical torque branched off from the planetary transmission 4 and the torque supplied by the hydraulic motor 11, can also be transmitted if required via the rear axle H, with engaged clutch 20.

Furthermore it is proposed in DE 42 09 950 C2 as an additional variant that at least one power train includes an isolating clutch. A drive 40, which additionally comprises such an isolating clutch 21 in the power train 17 of the front axle V, is illustrated by FIG. 2. The front axle V can be disconnected via the isolating clutch 21 from the drive by the hydraulic motor 12 and additionally from the drive by the hydraulic motor 11 and the mechanical branch of the planetary transmission 4, with engaged clutch 20.

In the case of both drives 30 and 40 of FIGS. 1 and 2 the hydraulic motor 11, additionally to the hydraulic motor 12, can drive the front axle V via engagement of the clutch 20. Vice versa the hydraulic motor 11 can be disconnected from the axle drive of the front vehicle axle V through disengaging the clutch 20. In the case of the drive 40 additionally the front vehicle axle V can be completely disconnected from the drive by the hydraulic motors 11 and 12 through disengaging isolating clutch 21. A mode of operation, wherein the two vehicle axles V and H are only driven by one hydraulic motor 11 or 12 with engaged clutch 20, is not possible either with the drive 30 of FIG. 1 or with the drive 40 of FIG. 2.

A further drive arrangement for all-wheel drive vehicles is described in the European Patent EP 1 234 706 B1. Two hydraulic motors, of which a first hydraulic motor is propulsively connected to the rear axle of the vehicle, are also provided in the case of this drive arrangement. The second hydraulic motor can be propulsively connected to the front axle via a second clutch. The front axle and the rear axle can be coupled propulsively together through engaging a first clutch and the second clutch. The drive arrangement of EP 1 234 706 B1 also does not allow a mode of operation, wherein the front axle is propulsively connected to the rear axle and together with this can be driven by the first hydraulic motor, after the second clutch between the second hydraulic motor and the front axle has been disengaged.

Usually it is expedient with drive arrangements, as they are described in DE 42 09 950 C2 and EP 1 234 706 B1, to design one of the two hydraulic motors and/or its translation so that a large torque can be transmitted. Such hydraulic motors and/or translations are usually not designed for high rotational speed ranges and thus for high driving speeds. Particularly at high driving speeds, where lower torques are required, substantial friction and leakage losses occur if all hydraulic motors are continually connected to the front axle and the rear axle and possibly further drivable axles of the vehicle.

Therefore, the present invention is based on the object of producing a drive for vehicles with at least two drivable vehicle axles, wherein two or more axles can be driven with translation, variable to each other, in a very wide rotational speed and torque range and which additionally offers the option of ensuring that all vehicle axles are driven in an as energy-saving way as possible over the entire speed range with extremely unequal axle load distribution.

The object is solved by a drive arrangement according to claim 1. Further embodiments of the invention are indicated in the sub-claims.

BRIEF SUMMARY OF THE INVENTION

According to the present invention a drive arrangement is produced for vehicles with at least two drivable vehicle axles. The drive arrangement comprises at least one first motor, which is propulsively connected to a first vehicle axle, and a second motor, which is propulsively connected to a second vehicle axle. The propulsive connection of the two motors to the respective vehicle axles in this case is designed so that at least one of the motors can be disconnected from the propulsive connection to the associated vehicle axle, and that regardless of whether this "de-connectable motor" is propulsively connected to the associated vehicle axle or is propulsively disconnected therefrom, a propulsive connection can be selectively made and broken between the first and the second vehicle axle. The drive arrangement according to the invention is particularly suitable for utility vehicles and agricultural tractors, such as for example a farm tractor.

The at least one motor, which is de-connectable from the propulsive connection to the associated vehicle axle, is called a "de-connectable motor" in the present description and in the claims. Possibly both the first motor and the second motor can be designed as de-connectable motors. Furthermore the drive arrangement according to the invention can also be used in vehicles with more than two drivable vehicle axles. In this case for example it may be provided for that each vehicle axle is assigned a corresponding motor and at least one of the motors is a de-connectable motor. This means that this de-connectable motor can be disconnected from the propulsive connection to the associated vehicle axle and, regardless of whether the de-connectable motor is propulsively connected to the associated vehicle axle or is propulsively disconnected therefrom, a propulsive connection can be selectively made and broken between the vehicle axle associated with this de-connectable motor and at least one further drivable vehicle axle. Furthermore, there is a possibility that in the case of vehicles which comprise more than two drivable vehicle axles two or more vehicle axles, preferably a twin axle, are propulsively connected to a common motor and in each case are driven with the same rotational speed and torque ratio.

"Propulsive connection" is understood to mean that torque and rotational speed can be transmitted between the drive components propulsively connected in each case. However, it is not necessary here that the drive components propulsively connected in each case are directly connected to one another. On the contrary, other components, such as for example a clutch, a transmission, etc, through which the torque and the rotational speed can be transmitted, may be interposed. Possibly the rotational speed and the torque can be changed by such interposed elements, as this is the case for example with a transmission. Also such interposed elements can serve to selectively break the propulsive connection as this is the case with a clutch.

The drive arrangement according to the invention only concerns the distribution of the drive power from the first and the second motor to the first and second vehicle axle (and possibly to further vehicle axles). Of course, further drive components can be provided on the first and second vehicle axle (and if necessary on the further vehicle axles), which for example regulate the distribution of the received drive power to the two wheels of the respective vehicle axle. For example the first and/or the second vehicle axle can comprise a drive for driving associated wheels of the vehicle axle, the wheels of the vehicle axle being indirectly driven by the associated motor via the drive. Such drives of the first and/or the second vehicle axle for example can comprise a planetary driveline arranged on the wheel hub and/or a differential, which serves as a differential gear between the respective wheels of a vehicle axle. However, the provision of such additional drive components on the respective vehicle axles is not crucial for the distribution, according to the invention, of the drive power to the first and second vehicle axle (and possibly to further vehicle axles).

Preferably, the two motors are part of an infinitely variable transmission. For this purpose it is not absolutely essential that the two motors themselves are adjustable. For example the two motors can be formed as non-adjustable hydraulic motors and can be driven by an adjustable hydraulic pump. Alternatively or additionally, however, also at least one of the motors can be adjustable. For example the two motors can be formed as variable electric motors and thus form an infinitely variable transmission.

The drive arrangement according to the invention on the one hand renders the possibility that the vehicle axles are driven with translation variable to each other. The drive arrangement can be actuated by sensors and a suitably constructed control unit especially so that the same slip develops on the wheels of the front vehicle axle and on the wheels of the rear vehicle axle in each case.

When rounding tight bends the turning radius of the front wheels is substantially greater than the turning radius of the rear wheels, so that tensions in the drive arrangement would result if a propulsive connection is made between the front axle and the rear axle of the vehicle. With the mode of operation of the drive arrangement according to the invention, wherein the propulsive connection is broken between the first and the second vehicle axle, the front wheels and the rear wheels of the vehicle can be driven with different translation, so that tensions in the power train are avoided. Furthermore various changes in diameter of the front tyres and the rear tyres of the vehicle, which arise for example due to differing wear conditions or loads, can be balanced out by providing a different translation, so that limited tensions in the power train are avoided as a result.

Because at least one of the motors is a de-connectable motor, one or more motors can be disconnected from the drive at higher driving speeds, so that the friction losses, and in the case of hydraulic motors the leakage losses are reduced as a result. Since, regardless of whether the de-connectable motor is propulsively connected to the associated vehicle axle or is propulsively disconnected therefrom, a propulsive connection can be selectively made and broken between the first and the second vehicle axle, over the entire driving speed range with extremely unequal axle load distribution, it can be ensured that all vehicle axles are driven due to the propulsive connection between the first and the second vehicle axle. Should the vehicle have passed over a tract of land on which an extremely unequal axle load distribution develops, if necessary the propulsive connection can be broken between the first and the second vehicle axle and the vehicle can be driven by the associated motor exclusively via one vehicle axle, for example the rear vehicle axle, thus saving fuel.

In an advantageous further embodiment of the present invention the propulsive connection and disconnection of the de-connectable motor from the associated vehicle axle take place via a first clutch. Preferably, the first clutch is designed as mechanical friction clutch. The propulsive connection and disconnection of the de-connectable motor can be made in a simple manner as a result of providing the first clutch. Furthermore, such a clutch can be actuated by a control unit so that the propulsive connection and the propulsive disconnection can be carried out automatically. If a plurality of de-connectable motors is used, a separate clutch can be provided accordingly for each de-connectable motor.

In an advantageous further embodiment of the present invention the de-connectable motor comprises an output shaft driven by the latter, wherein propulsive connection between the de-connectable motor and the associated output shaft can be selectively made and broken via the first clutch. By arranging the first clutch in direct proximity to the associated de-connectable motor the functionality according to the invention, wherein regardless of whether the de-connectable motor is propulsively connected to the associated vehicle axle or propulsively disconnected therefrom, a propulsive connection can be selectively made and broken between the first and the second vehicle axle, may be realized in a particularly simple and space-saving way.

Preferably the propulsive connection and disconnection of the first and the second vehicle axle take place via a second clutch. The use of a clutch offers the same advantages as described above with regard to the first clutch. Preferably the second clutch is also again designed as a mechanical friction clutch.

According to an advantageous further embodiment of the present invention the second clutch can be adjusted with regard to its torque transmission capacity. Preferably the second clutch is a slip clutch in the form of a mechanical friction clutch. In this case a slip clutch non-positively connects two shafts until a limit value for the transmitted torque is reached. If higher torque is applied to the slip clutch, the clutch slips and transfers the maximum torque able to be transmitted, which corresponds to the limit value. Due to the adjustability of the torque transmission capacity this limit value can be altered and thus the torque, able to be transmitted by the clutch, can be varied.

Furthermore there is a possibility of actuating such clutches by a control unit so that only a percentage amount of the applied torque is transmitted. Thus, the clutch is constantly operated as a "friction clutch", since only part of the applied torque is always transmitted. The percentage amount transmitted preferably lies in the range from 5%-20%, more preferably in the range from 8%-12%, of the applied torque.

Due to the adjustability of the torque transmission capacity, torque can be transferred via a friction clutch from the drive of a faster rotating vehicle axle to the drive of another vehicle axle if very high traction power is demanded by the vehicle. Thus higher torque can be achieved on the other vehicle axle rotating more slowly. Since however only part of the applied torque and/or torque restricted to a limit value is transmitted, variable translation between the vehicle axles is present when rounding tight bends, so that tensions in the power train are avoided.

In an advantageous further embodiment of the invention the drive arrangement comprises a control unit for regulating the second clutch, wherein the control unit is coupled to at least one sensor and regulates the second clutch as a function of the values detected by the at least one sensor. Preferably, in this case the control unit is coupled to a slip sensor, a sensor for identifying a steering angle of a steerable vehicle axle, a sensor for detecting total torque of the drive arrangement and therefore of the vehicle, a sensor for detecting the driving speed of the vehicle and/or a sensor for detecting the rotational speed of the wheels and/or the vehicle axles and effects control according to the values detected by this/these sensor (s). Thus, torque can be transferred in a defined way from a faster rotating vehicle axle to a more slowly rotating vehicle axle, where increased traction power is required. Thus torque higher than can be made available alone by the motor assigned to this vehicle axle, can be achieved on a specific vehicle axle. Furthermore the torque transmitted by the second clutch can be adjusted so that variable translation between the vehicle axles continues to be present and therefore when rounding tight bends, tensions in the power train are avoided. The torque transmitted by the second clutch is reduced preferably for example with increasing steering angle of a steerable vehicle axle. Furthermore a control unit, through which the torque transmitted by the second clutch is reduced with increasing driving speed, is advantageous. Vice versa at low driving speeds and/or with narrow steering angles it is advantageous for effective drive of the vehicle if the torque transmitted by the second clutch is adjusted to a higher value by the control unit. Additionally it is expedient to regulate the second clutch as a function of the rotational speed ratio of the wheels of the respective vehicle axles and/or the vehicle axles themselves. For example, if a rotational speed ratio between front axle and rear axle of the vehicle is exceeded or not reached, this means that one vehicle axle is rotating substantially faster and thus substantially higher slip develops than on the other vehicle axle. In this case if the torque transmitted by the second clutch is increased through the control unit, torque can be transferred from the faster rotating vehicle axle to the more slowly rotating vehicle axle, so that spinning of the wheels of a vehicle axle is avoided and effective drive is provided as a result. Similarly, vehicle axles with high slip and thus with higher rotational speed can be detected by slip sensors, which are arranged on the wheels or on the vehicle axles themselves, and through corresponding engagement of the second clutch, torque can be transferred from these vehicle axles to vehicle axles with less slip or with slower rotational speed.

In an advantageous further embodiment of the invention the second clutch can be pre-tensioned in an engaged position. Preferably pre-tensioning is effected by means of a spring. As a result the drivable vehicle axles are rigidly coupled in situations such as an emergency operation or stationary position of the vehicle. In particular, a parking brake can act on all wheels in these situations.

In an advantageous further embodiment at least the de-connectable motor is an adjustable motor. This means that the rotational speed and the torque of this motor can be adjusted. Thus for example the drive power, transmitted by this motor, can be reduced with increasing driving speed and then the motor can be disconnected from the power train.

In order to be able to use the available construction space of a vehicle advantageously, it is expedient if the first and/or the second clutch is/are arranged coaxially to a final drive shaft of a vehicle axle, particularly to a front wheel drive shaft. Thus it is avoided that many components need to be arranged in the vehicle longitudinal direction one behind the other.

In order to transmit the torque delivered by the motors to the vehicle axles or to their drives with as little friction loss as possible, the first motor is arranged coaxially to a final drive shaft of the first vehicle axle, which is propulsively connected to the first motor. Alternatively or additionally it may be provided for that the second motor is arranged coaxially to an axle drive shaft of the second vehicle axle, which is propulsively connected to the second motor. Thus the number of necessary transmission parts between the respective motor and the associated vehicle axle is reduced, so that the friction loss arising is kept to a minimum. It should be considered that the transmission parts, which serve to transfer torque between the drivable vehicle axles, only transmit torque if a propulsive connection has been made between the respective vehicle axles (for example via the second clutch). Only in this case does friction loss develop at these transmission parts.

In an advantageous further embodiment of the present invention a control unit is provided, which actuates the motor connected to a steerable vehicle axle and/or the second clutch so that a traction power component, assigned to this steerable vehicle axle, is dimensioned such that, at low driving speeds, it lies above the amount of the vehicle weight load on this steerable vehicle axle. Low driving speed here is particularly understood to mean a speed range from 0-15 km/h. Preferably the steerable vehicle axle is the front axle of a vehicle. As a result of such dimensioning of the traction power component it is ensured that in particular when rounding tight bends the slip on the wheels of the front vehicle axle (and/or on the steerable vehicle axle) is somewhat higher than on the wheels of the rear vehicle axle (and/or the non-steerable vehicle axle). This leads to especially narrow turning radii of the vehicle. Particularly in the case of a steerable front vehicle axle the vehicle is pulled inwards into the bend by the slip developing. If the second clutch is completely disengaged the control unit accordingly only needs to actuate the motor which is propulsively connected to the steerable vehicle axle. If the second clutch, able to be adjusted with regard to its torque transmission capacity, is additionally engaged, or more precisely frictionally engaged, the torque transmitted by the second clutch should thus also be adjusted accordingly by the control unit. Particularly the second clutch should be actuated so that this is operated in the mode of a friction clutch and torque is transferred from the drive of the front axle to the drive of the rear axle, without the mode of operation having to be left regardless of the rotational speed between front axle and rear axle. In this case the torque transmitted by the second clutch is ideally adjusted so that torque is adequately transferred to the non-steerable vehicle axle(s), particularly to the rear vehicle axle, from the steered vehicle axle and spinning of the wheels of the front axle is avoided.

In an advantageous further embodiment the first and the second motor are hydraulic motors in each case, which are driven by a common adjustable hydraulic pump. The hydraulic motors and the hydraulic pump thereby form an infinitely variable transmission. As will be evident from the following description, such an infinitely variable transmission can also be formed by other motors, such as for example electric motors.

Preferably the adjustable hydraulic pump is driven by an internal combustion engine and/or an electric motor (in the case of an electrically-driven vehicle). Particularly exclusively an internal combustion engine, exclusively an electric motor, or a combination of combustion engine and electric motor can serve as the power source for the hydraulic pump.

The hydraulic pump is adjusted as a function of the power demand, which the driver sets by corresponding movement of the accelerator pedal and/or a driving speed lever.

In an advantageous further embodiment of the invention it is provided for that a power branched transmission is arranged between the power source, that is to say between the internal combustion engine and/or the electric motor, and the hydraulic pump and that part of the drive power is mechanically transmitted directly to at least one driven vehicle axle, preferably the rear axle. Preferably the power branched transmission is formed as a planetary transmission or as planetary gears. Furthermore it may be provided for that the drive power for a PTO shaft drive of the vehicle is branched off directly from the output shaft of the internal combustion engine and/or the electric motor. Of course, however, alternatively the entire drive power delivered by the internal combustion engine and/or the electric motor can be transmitted directly to the hydraulic pump.

In an advantageous further embodiment of the invention the piston stroke of the de-connectable hydraulic motor can be adjusted between a maximum value and zero. In the case of zero stroke, torque is no longer transmitted to the output shaft of the de-connectable hydraulic motor. Thus the connection of the de-connectable hydraulic motor can be broken and made in the case of zero stroke particularly simply, free of torque and jerk via the first clutch. After the first clutch has been disengaged the hydraulic motor will stop automatically. Additionally it may be provided for that the de-connectable hydraulic motor is stopped by means of a stopping device, for example a brake, or disconnected from its pressure supply by means of a valve.

In an advantageous further embodiment of the invention a control unit, which actuates the de-connectable hydraulic motor so that its piston stroke is reduced with increasing driving speed, is provided. Preferably the de-connectable hydraulic motor in this case is propulsively connected to a steerable vehicle axle, particularly a steerable front axle. Accordingly the piston stroke of the de-connectable hydraulic motor at low driving speed is adjusted close to the maximum value so that a comparatively high traction power component is transmitted by the wheels of the front vehicle axle and allows rounding of tight bends. With increasing driving speed however the piston stroke of the hydraulic motor is reduced, so that the traction power component of the front vehicle axle reduces accordingly. In the case of zero stroke and/or disengaged first clutch, the traction power component of the front vehicle axle is zero so that pure rear-wheel drive, often desired at high driving speeds, is present.

In an advantageous further embodiment of the present invention the de-connectable hydraulic motor is connected to the associated vehicle axle via a gear wheel stage with large translation. Alternatively or additionally it may be provided for that the de-connectable hydraulic motor is equipped with a greater piston stroke than the other hydraulic motors or the other hydraulic motor of the drive arrangement. Thus high traction power at low driving speeds can be produced on the wheels of the associated vehicle axle, preferably the front axle.

Preferably a control unit, which actuates the first clutch, is provided so that the propulsive connection of the de-connectable hydraulic motor is disconnected from the associated vehicle axle before a maximum permissible rotational speed of the de-connectable hydraulic motor is reached. Thus substantial friction and leakage losses, which are caused by the hydraulic motor in the high-speed range, are avoided. Disconnection of the hydraulic motor is preferably controlled in combination with the continuous reduction of the piston stroke of this de-connectable hydraulic motor with increasing driving speed, as described above.

In an advantageous further embodiment of the present invention a control unit, which actuates the first clutch, is provided so that it disconnects the de-connectable hydraulic motor from the associated vehicle axle whenever a first limit value of the vehicle speed is exceeded, and so that it propulsively connects the de-connectable hydraulic motor to the associated vehicle axle whenever a second limit value of the vehicle speed is not reached, the first limit value being higher than the second limit value. This means that if vehicle speeds constantly vary in the range between the second and the first limit value the de-connectable hydraulic motor is not being constantly propulsively connected and disconnected. Thus unnecessary, brief disconnection and connection of the de-connectable hydraulic motor, which would lead to heavier demand on the de-connectable hydraulic motor and increased fuel consumption, are avoided.

As explained above, other motors, for example electric motors, can also be used in place of hydraulic motors. The controls and modes of operation, which as further embodiments were described above with regard to the hydraulic motors, can be realized in a corresponding way by suitable regulation and/or configuration of the electric motors.

BRIEF DESCRIPTION OF THE DRAWINGS

Further features and advantages of the invention will become clear from the description of exemplary embodiments on the basis of the appended drawings. The figures show.

DETAILED DESCRIPTION OF PREFERRED EMBODIMENTS

Figure 1:
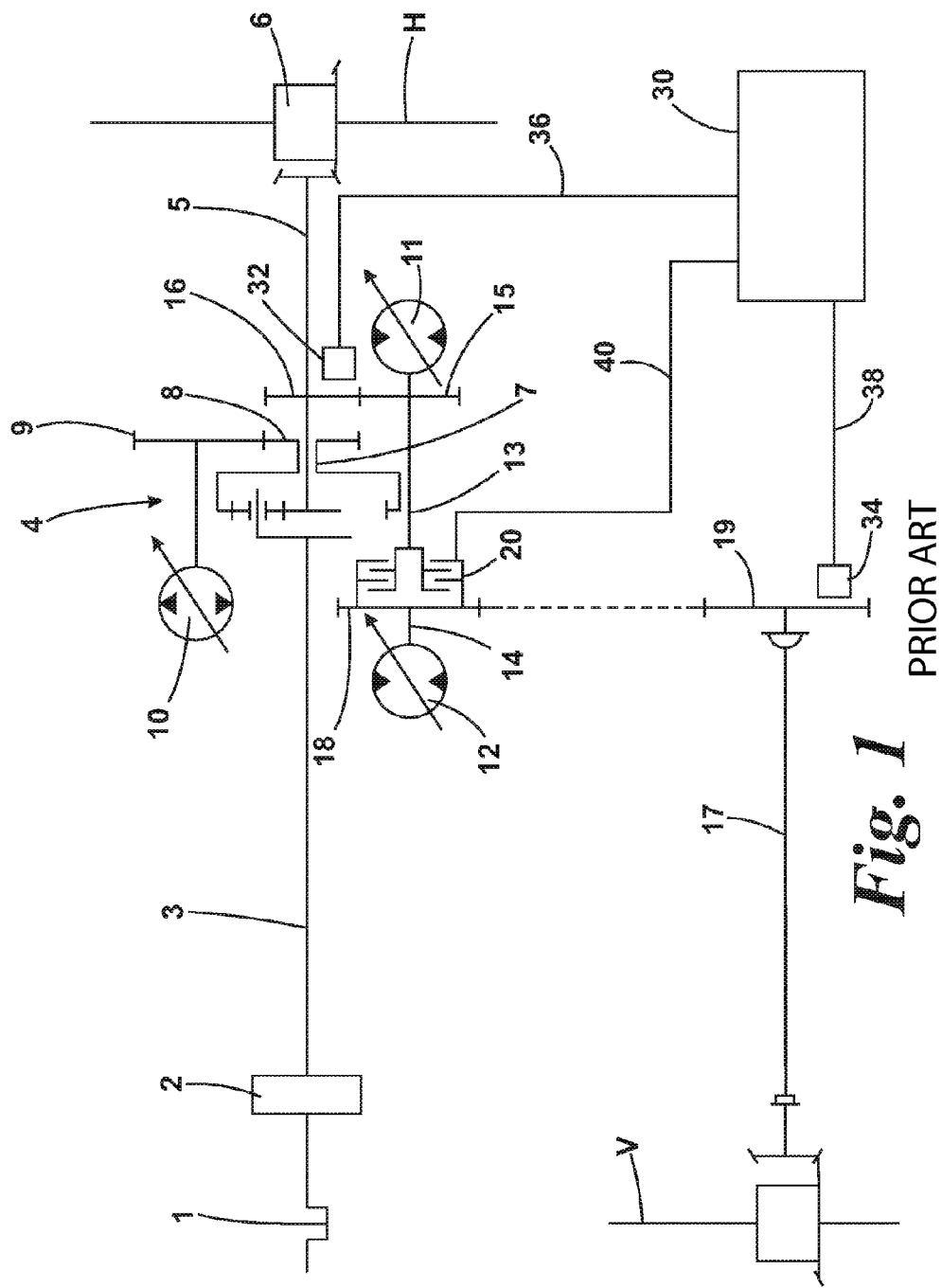
FIG. 1 is a schematic illustration of a drive, as is known from the prior art.
Figure 2:
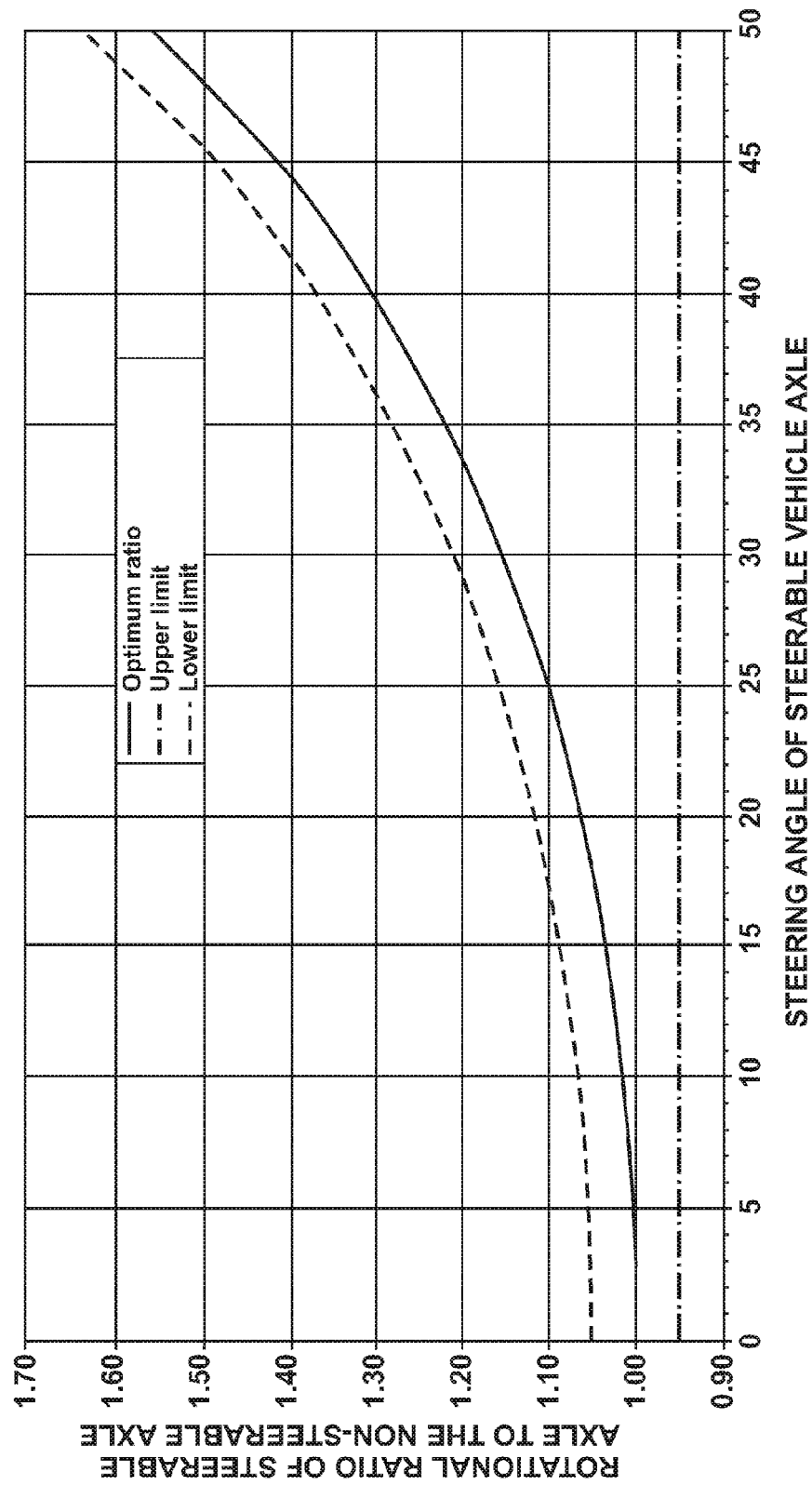
FIG. 2 is a schematic illustration of a modified drive, as is known from the prior art.

In the following description of preferred exemplary embodiments of the present invention the same reference symbols, as used for the drive arrangement shown in FIG. 1, are used for identical components. Also, regarding the description of similar components, reference is made to the description of FIG. 1. Primarily, the differences of the drive arrangement according to the invention in relation to the conventional drive arrangement illustrated in FIG. 1 are discussed in detail below.

In the case of the drive 50 illustrated in FIG. 3, additionally to the clutch 20 (below: second clutch 20) a further clutch 22 (below: first clutch) is provided on the output shaft 14 of the hydraulic motor 12. The hydraulic motor 12 is designed accordingly as a de-connectable hydraulic motor. As is evident on the basis of FIG. 3, the first clutch 22 can be disengaged and engaged regardless of the position of the second clutch 20.

Accordingly regardless of whether the de-connectable hydraulic motor 12 is propulsively connected to the associated vehicle axle (here: front axle V) via the first clutch 22 or propulsively disconnected therefrom, a propulsive connection can be selectively made and broken between the front axle V and the rear axle H via the second clutch 20.

Thus the following modes of operation result:

If both the first clutch 22 and the second clutch 20 are engaged, the front axle V and the rear axle H are propulsively connected to each other. The vehicle axles V and H in this case are driven in common by the two hydraulic motors 11 and 12 as well as by the mechanical component of the drive power of the internal combustion engine 1 branched off at the planetary transmission 4. As explained above very high torques on the respective vehicle axles, at which increased traction power is demanded, can be produced in this mode of operation. As explained above there is also a possibility of operating the second clutch 20 as a "friction clutch" so that the rotational speed ratio between the front vehicle axle and rear vehicle axle is not fixed at a specific value and only limited torque can be transmitted between front axle V and rear axle H.

In a second mode of operation the second clutch 20 is disengaged, while the first clutch 22 is engaged. Accordingly the rear vehicle axle is driven by the hydraulic motor 11 and by the component of the drive power of the internal combustion engine 1 branched off at the planetary transmission 4. The front axle V is driven exclusively by the hydraulic motor 12. Different torques and different rotational speeds can be adjusted on the front axle V and on the rear axle H accordingly. This mode of operation is particularly advantageous when rounding bends in all-wheel drive.

A third mode of operation results through the first clutch 22 being disengaged and the second clutch 20 being engaged. Accordingly the hydraulic motor 12 is disconnected from the power train. The front axle V and the rear axle H are propulsively connected via the second clutch 20. As explained above, the second clutch 20 can also be operated as a "friction clutch" with this mode of operation. This mode of operation is particularly suitable for average driving speeds whenever an unequal axle load distribution between the vehicle axles is present or unfavourable road conditions (for example snow cover) demand all-wheel drive.

A fourth mode of operation results if both the first clutch 22 and the second clutch 20 are disengaged. In this mode of operation the rear axle H is driven exclusively by the hydraulic motor 11 and by the component of the drive power of the internal combustion engine 1 branched off from the planetary-gear transmission 4. Therefore, pure rear-wheel drive, which is particularly desirable at high driving speeds, is present. Even at high driving speeds with the present invention there is a possibility by engaging the second clutch 20 of propulsively connecting the front axle V and the rear axle H, and transferring torque from one axle to the other axle. Furthermore there is again a possibility of operating the clutch 20 only as a "friction clutch".

Figure 3:
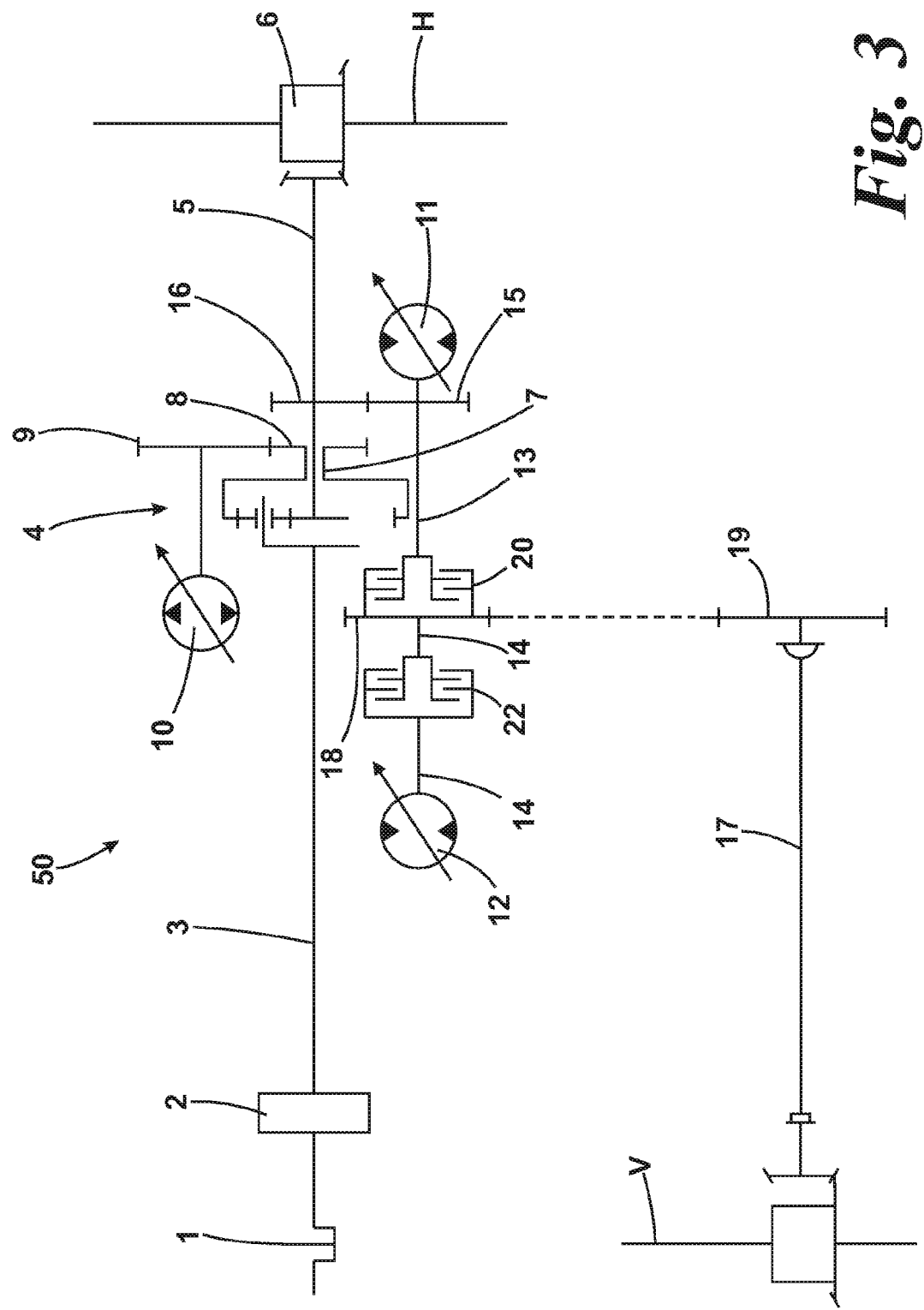
FIG. 3 is a schematic illustration of a drive according to a first embodiment of the present invention.
Figure 4:
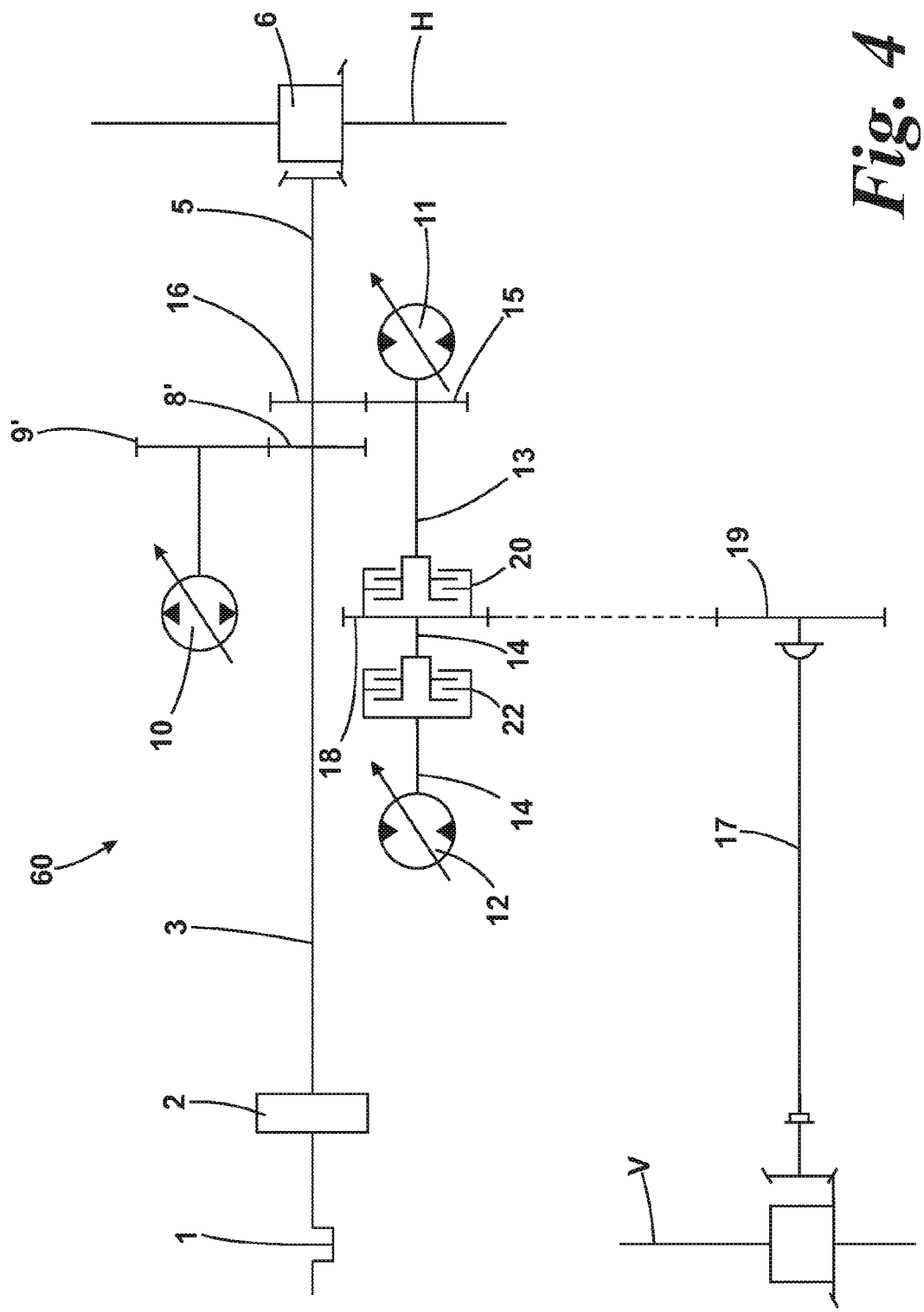
FIG. 4 is a schematic illustration of a drive according to a second embodiment of the present invention.

FIG. 4 illustrates a second embodiment of a drive 60. Only the differences in relation to the embodiment illustrated in FIG. 3 are discussed in detail below. In the case of the drive 60 no power branched transmission, as formed in FIG. 3 by the planetary transmission 4, is provided. By contrast the entire drive power of the input shaft 3 is transmitted via a gear wheel stage 8', 9' to the hydraulic pump 10. The adjustable hydraulic pump 10 in turn drives the two parallel-connected hydraulic motors 11, 12 via (not illustrated) hydraulic lines. The hydraulic motor 11 is thereby constantly propulsively connected via the gear wheel stage 15, 16 to the rear axle H. Contrary to the embodiment illustrated in FIG. 3 a component of the drive power of the internal combustion engine 1 directly branched off from the input shaft 3 is not additionally fed to the rear axle H.

The arrangement of the hydraulic motors 11, 12 and the clutches 20, 22 in all other respects corresponds to the arrangement illustrated in FIG. 3. Accordingly the same switch states, as explained above with reference to FIG. 3, also result. A difference is only to be seen roughly in that the rear axle H is driven in none of the switch states by drive power which is branched off directly from the input shaft 3.

Figure 5:
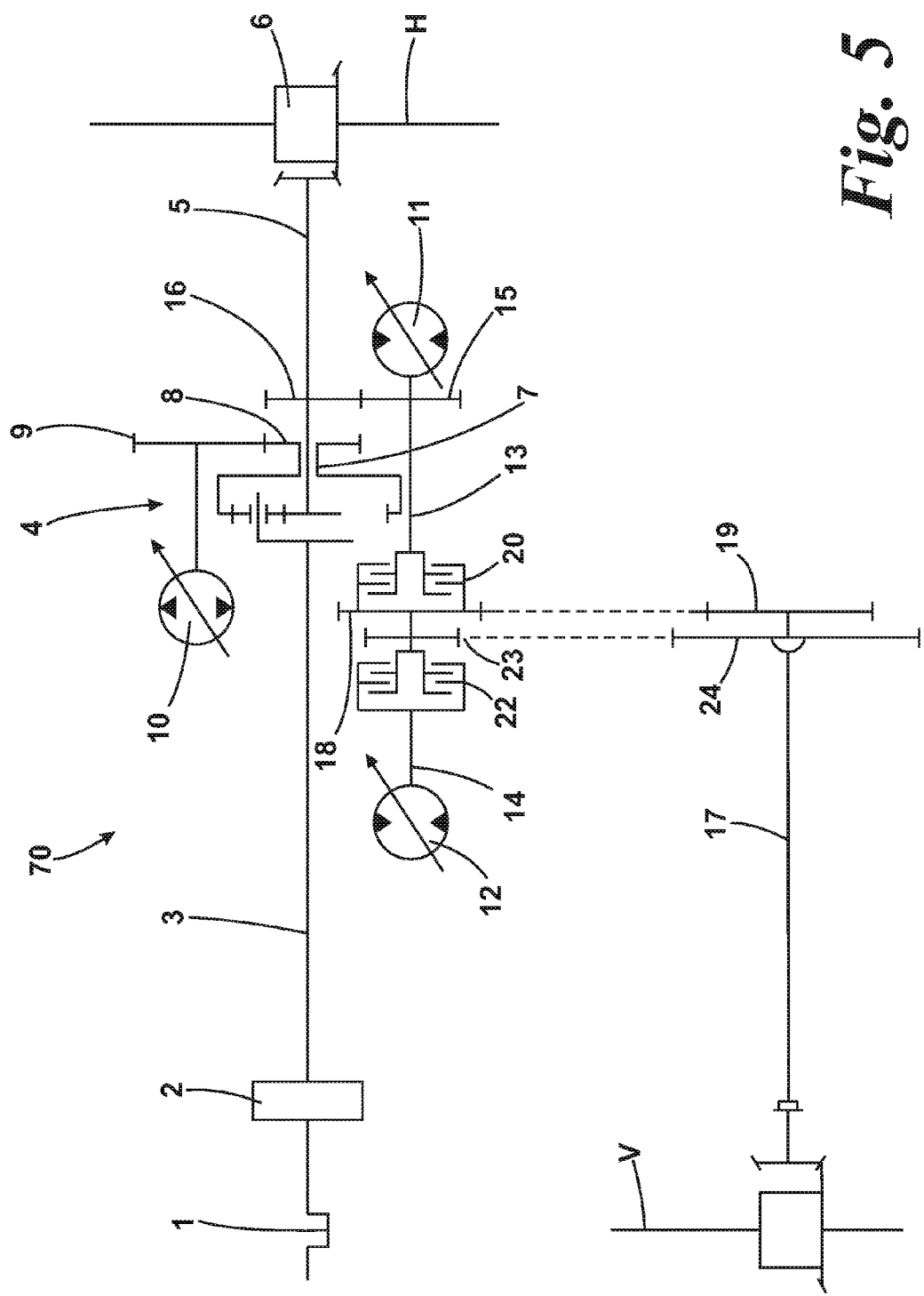
FIG. 5 is a schematic illustration of a drive according to a third embodiment of the present invention.

FIG. 5 illustrates a drive 70 with a drive arrangement according to a third embodiment of the present invention. Only the differences in relation to the embodiment illustrated in FIG. 3 are discussed in below. As in the case of the drive 50 shown in FIG. 3, the hydraulic motor 11 can be propulsively connected via the second clutch 20 and gear wheel stage 18, 19 to the power train of the front vehicle axle V. In contrast to the embodiment illustrated in FIG. 3 the de-connectable hydraulic motor 12 is not propulsively connected via the first clutch 22 to the gear wheel stage 18, 19 but connected to a separately formed gear wheel stage 23, 24. The gear wheel stage 23, 24 in this case has a large translation, so that high torque can be transmitted from the hydraulic motor 12 to the front vehicle axle V. As explained above, particularly at low driving speeds, high torque can therefore be transmitted via the de-connectable hydraulic motor 12 to the front axle V so that high traction forces are produced on the front vehicle axle as a result. At higher driving speeds the de-connectable hydraulic motor 12 is preferably disconnected via the first clutch 22 from the power train 17. As illustrated in FIG. 5 the first de-connectable clutch 22 in turn is arranged on the output shaft 14 of the de-connectable hydraulic motor 12.

In all other respects the drive arrangement illustrated in FIG. 5 corresponds to the drive arrangement illustrated in FIG. 3. In particular the four different switch states explained regarding FIG. 3 are possible.

The present invention is not limited to the exemplary embodiments illustrated in the figures. More particularly, different motors such as for example electric motors can also be used in place of the hydraulic motors 11 and 12. According to the embodiment illustrated in FIG. 3 the drive power, produced by an internal combustion engine 1, can be branched off in a planetary transmission 4, wherein a generator, which is provided in place of the hydraulic pump 10, can be driven by a component of the mechanical drive power. The electric power produced by the generator can then be fed in turn to the two electric motors, which are provided in place of the hydraulic motors 11 and 12. In the case of such an arrangement, as illustrated in FIGS. 4 and 5, modifications are possible in a corresponding way. If the vehicle is driven exclusively by electricity, the at least two electric motors, which are provided in place of the hydraulic motors 11 and 12, can also be supplied with electric power, which is delivered by a battery, fuel cell etc.

Various control units, particularly for controlling the first clutch, the second clutch and the two motors are described in the introductory part of the description. These can be designed both separately and as a common control unit.

I claim:

1. A drive arrangement for agricultural tractors and utility vehicles with at least first and second drivable vehicle axles, the drive arrangement comprising:
a first motor propulsively connected to said first vehicle axle; and
a second motor propulsively connected to said second vehicle axle,
wherein at least one of the first or second motors is a de-connectable motor, the de-connectable motor can be propulsively disconnected from its respective vehicle axle via a first clutch and wherein, regardless of whether said de-connectable motor is propulsively connected to or propulsively disconnected from its respective vehicle axle, said first vehicle axle and said second vehicle axle can be propulsively connected and propulsively disconnected via a second clutch.

2. The drive arrangement according to claim 1, wherein the de-connectable motor has an output shaft driven by the de-connectable motor, and wherein the de-connectable motor and said output shaft are propulsively connected and propulsively disconnected via said first clutch.

3. The drive arrangement according to claim 1, wherein the second clutch is adjustable with regard to a torque transmission capacity of the second clutch, specifically in that the second clutch is a slip clutch in the form of a mechanical friction clutch.

4. The drive arrangement according to claim 3, further comprising a control unit which actuates the second clutch so that the second clutch transmits a percentage amount from 5%-20% of an applied torque.

5. The drive arrangement according to claim 3, further comprising a control unit for controlling the second clutch, wherein the control unit is coupled to at least one sensor, said at least one sensor is selected from a) a slip sensor, b) a steering angle sensor for detecting a steering angle wherein one of said first and second axles is a steerable vehicle axle, c) a torque sensor for detecting total torque of the drive arrangement, d) a driving speed sensor for detecting a driving speed of the vehicle, and e) a rotational speed sensor for detecting the rotational speed of vehicle wheels and/or of the first and second vehicle axles, and in that the control unit actuates the second clutch as a function of values detected by the at least one sensor.

6. The drive arrangement according to claim 1, wherein the second clutch is pre-tensioned by a spring in an engaged position of the second clutch.

7. The drive arrangement according to claim 1, wherein at least the de-connectable motor is an adjustable motor.

8. The drive arrangement according to claim 1, wherein at least one of the first and second drivable vehicle axles comprises a planetary driveline, the planetary driveline drives associated wheels of said at least one vehicle axle, wherein said associated wheels of said at least one vehicle axle are indirectly driven by the respective first or second motor connected to said at least one vehicle axle via said planetary driveline.

9. The drive arrangement according to claim 1, wherein one of said first and second vehicle axles is a front steerable axle, said drive arrangement further comprises a control unit which actuates the de-connectable motor, and a traction power component which is assigned to said steerable vehicle axle, wherein said de-connectable motor is propulsively connected to said steerable front vehicle axle and the second clutch, so that the traction power component is provided by the de-connectable motor and dimensioned such that, at low driving speeds, the traction power component moves said steerable vehicle axle.

10. The drive arrangement according to claim 1, wherein each of the first and the second motors is a hydraulic motor, and wherein the first and the second hydraulic motors are driven by a common adjustable hydraulic pump.

11. The drive arrangement according to claim 10, wherein the hydraulic pump is driven by drive means comprising an internal combustion engine and/or an electric motor.

12. The drive arrangement according to claim 11, wherein a planetary transmission is arranged between the drive means and the hydraulic pump, so that a drive power is mechanically transmitted directly to a rear vehicle axle, said rear vehicle axle being one of said first or second vehicle axles.

13. The drive arrangement according to claim 10, wherein the de-connectable motor has a piston stroke that is adjustable between a maximum value and zero.

14. The drive arrangement according to claim 13, further comprising a control unit, which actuates the de-connectable hydraulic motor so that said piston stroke is reduced with increasing driving speed.

15. The drive according to claim 10, wherein the one of said at least first and second driveable vehicle axles to which said de-connectable hydraulic motor is propulsively connected is a steerable vehicle axle, specifically a steerable front vehicle axle.

16. The drive arrangement according to claim 10, further comprising a control unit, which actuates said first clutch so that said first motor is propulsively disconnected from said first vehicle axle before a maximum permissible rotational speed of the de-connectable hydraulic motor is reached.

17. The drive arrangement according to claim 10, further comprising a control unit which actuates said first clutch so that said first clutch disconnects the de-connectable hydraulic motor from its respective vehicle axle whenever a first limit value of a vehicle speed is exceeded, said control unit also actuates said first clutch to propulsively connect the de-connectable hydraulic motor to its respective vehicle axle whenever a second limit value of the vehicle speed is not reached, said first limit value being higher than said second limit value.

18. The drive arrangement according to claim 1, wherein the first and second motors are formed in each case by an electric motor.

19. A vehicle, comprising:
a first drivable vehicle axle;
a second drivable vehicle axle;
a first motor, propulsively connected to said first vehicle axle; and
a second motor propulsively connected to said second vehicle axle;
a first clutch connecting the first drivable vehicle axle and the first motor; and
a second clutch connecting the first vehicle axle and the second vehicle axle;
wherein the first motor is a de-connectable motor, which can be propulsively disconnected from the first drivable vehicle axle via said first clutch and wherein, regardless of whether the first motor is propulsively connected to or propulsively disconnected from the first drivable vehicle axle, said second clutch selectively connects and disconnects said first vehicle axle and said second vehicle axle.

* * * * *